United States Patent Office 3,449,457
Patented June 10, 1969

3,449,457
HYDROCARBON CONVERSION
Ronald O. Downs, St. Louis, and Raymond A. Franz, Kirkwood, Mo., assignors to Monsanto Company, St. Louis, Mo., a corporation of Delaware
No Drawing. Filed Dec. 20, 1966, Ser. No. 603,175
Int. Cl. C07c *3/32, 15/02*
U.S. Cl. 260—669                                 10 Claims The present invention relates to a process for the production of $\alpha$-methylstyrene. More particularly, the present invention relates to a thermal, non-catalytic cracking process for the conversion of certain mono-alkyl aromatic hydrocarbons to $\alpha$-methylstyrene.

One of the most useful of the hydrocarbons monomers is $\alpha$-methylstyrene. The polymer products obtained from this monomer are quite useful in laminating fiber glass and in utilities requiring good heat stability. As a result of the usefulness of this monomer, there is a consistent demand for a good supply of this material. Presently, substantial quantities of $\alpha$-methylstyrene are made by the dehydrogenation of the corresponding alkyl aromatic hydrocarbon. However, new and more versatile processes for producing $\alpha$-methylstyrene are needed.

It is an object of the present invention to provide a new and novel process for the preparation of $\alpha$-methylstyrene. An additional object of the present invention is to provide a new and novel thermal, non-catalytic cracking process for the conversion of certain mono-alkyl benzenes having greater than four carbon atoms in the alkyl side-chain to $\alpha$-methylstyrene. Additional objects will become apparent from the following description of the invention herein disclosed.

The present invention which fulfills these and other objects is a process which comprises subjecting mono-alkyl benzenes having the formula

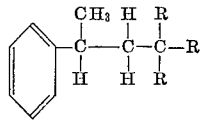

wherein R is either hydrogen or a hydrocarbonyl radical, to a thermal reaction zone maintained at a temperature within the range of 500 to 800° C. in the presence of at least one modifying agent selected from the group consisting of (1) $H_2S$, HBr, HCl, HI, and combinations thereof, and (2) compounds and elements which under the conditions of the reaction zone will form $H_2S$, HBr, HCl, HI, and combinations thereof. By the process of the present invention, a substantially improved conversion of the mono-alkyl benzene feed to $\alpha$-methylstyrene is obtained. Also, a very substantial improvement in yield of $\alpha$-methylstyrene from the cracking of the mono-alkyl benzene feeds are obtained through the use of the process of the present invention.

In order to further describe as well as demonstrate the present invention, the following examples are presented. These examples are not to be construed as limiting the present invention.

Example I

Sec-butyl benzene containing 3 mole percent of benzenethiol as a modifying agent was passed through a tubular reaction chamber at a liquid hourly space velocity of 5.5. The reaction tube had an internal diameter of 0.18 in. and a volume of 13.7 ml. The temperature within the reaction tube was approximately 600° C. and the pressure was the autogenous pressure of the reactants within the reaction tube and was essentially atmospheric pressure. On collection and analysis of the effluent of the reaction tube, it was found that a conversion of 44.1%, sec-butyl benzene to $\alpha$-methylstyrene, was obtained. The yield of $\alpha$-methylstyrene was 59.6% while the yield of styrene was 7.1%.

Example II

Example I was repeated with the exception that no modifying agent was used. A conversion of sec-butyl benzene to $\alpha$-methylstyrene of 38% was obtained. The yield of $\alpha$-methylstyrene was only 27.9% and the yield of styrene was 12.0%.

From comparison of Examples I and II above, it is readily noted that a substantial improvement in both conversion and yield is obtained by the process of the present invention. With the run described in Example I above, which was carried out in accordance with the present invention, an improvement in conversion of approximately 16.1% and an improvement in yield of approximately 114% were obtained as compared to the run described in Example II above.

Example III

Example I is repeated with the exception that the mono-alkyl benzene is 2-methyl-4-phenylpentane and the modifying agent is bromo-propane. Both a good conversion to and high yield of $\alpha$-methylstyrene are obtained.

Example IV

Example I is repeated with the exception that the mono-alkyl benzene is 2,2-dimethyl-4-phenylpentane and the modifying agent is $H_2S$. Both a good conversion to and high yield of $\alpha$-methylstyrene are obtained.

The modifying agents useful in the process of the present invention comprise (1) $H_2S$, HBr, HCl, HI, and combinations thereof, or (2) compounds and elements which under the conditions of the reaction zone will form $H_2S$, HBr, HCl, HI, and combinations thereof. Within group (1), HBr is usually preferred over the other hydrogen halides. However, of group (1), $H_2S$ is preferred over the hydrogen halides.

The compounds or elements which will decompose or otherwise form $H_2S$, HBr, HCl, HI, or combinations thereof under the conditions of the reaction zone broadly include virtually any compound or element which, as defined, will form these materials under such conditions. Included within this group are elemental sulfur, chlorine, bromine, iodine, as well as chemical compounds of which sulfur, bromine, chlorine and iodine are a part. The compounds which contain chlorine, bromine, iodine or sulfur may be either organic or inorganic compounds and may contain in addition to these elements such other elements as carbon, hydrogen, oxygen or nitrogen. If the compound is an organic compound, it may be saturated or unsaturated, aliphatic or aromatic, straight-chain branched-chain or cyclic in structure. Among the halogen-containing compounds within the scope of the present invention are the following non-limiting examples:

| Column I | Column II | Column III |
|---|---|---|
| 2-bromopropane | Bromobenzene | Chloroethanoic acid. |
| 2-chloropropane | Chlorobenzene | 1-iodopropane. |
| m-Dichlorobenzene | Di-iodoethanoic acid | 1-bromobutane. |
| o-Dichlorobenzene | $\alpha$-Chloroacetamide | 1-chlorobutane. |
| p-Dichlorobenzene | 2-iodobutane | m-Dibromobenzene. |
| Benzoyl chloride | 1-bromopentane | o-Dibromobenzene. |
| Benzoyl bromide | 2-bromopentane | p-Dibromobenzene. |
| Benzoyl iodide | 3-chlorpentane | Iodobenzene. |
| Butanoyl chloride | 2-iodopentane | o-Iodotoluene. |
| Butanoyl bromide | 3-bromohexane | m-Iodotoluene. |
| Butanoyl iodide | 2-bromohexane | p-Iodotoluene. |
| 2-chloro-1,4-benzenediol | 2-iodohexane | o-Chlorotoluene. |
| 2-bromo-1,4-benzenediol | 2-bromo-4-methylhexane | m-Chlorotoluene. |
| 1-chloro-4-nitronaphthalene | 3-chloroheptane | p-Chlorotoluene. |
| Ethylene chlorobromide | 3-bromoheptane | o-Bromotoluene. |
| 2-iodoheptane | m-Bromotoluene | Succinyl chloride. |
| 3-bromo-4-ethyl hexane | p-Bromotoluene | 4-chloroquinoline. |
| 4-bromo-octane | 3,5-dibromotoluene | Ethanoyl iodide. |

TABLE—Continued

| Column I | Column II | Column III |
|---|---|---|
| 3-chloro-octane | o-Bromo-chloro-benzene. | Hexanoyl chloride. |
| 2-iodo-octane | m-Bromo-chloro-benzene. | Decanoyl chloride. |
| 1-bromononane | p-Bromo-chloro-benzene. | 2-bromoethanol. |
| 2-chlorodecane | 2-bromonaphthalene | 2-chloroethanol. |
| 2-bromodecane | 1-chloronaphthalene | bis-β-Chloroethyl-ether. |
| 2-bromo-6-methyl decane. | 1,3-dichloronaphthalene. | Chloromethoxy methane. |
| 4-iodoundecane | 2-chlorodiphenyl | Cyclohexylbromide. |
| 1-bromododecane | 4-chlorodiphenyl | Carbon tetrachloride. |
| 3-bromo-4-octene | 2-bromo-2-pentene | 2-chloro-3-hexene. |

The halogen-containing compounds most useful in the practice of the present invention are those which contain a halogen from the group consisting of bromine, chlorine and iodine and the elements carbon and/or hydrogen. These compounds are the halogen-substituted hydrocarbons and hydrogen halides. There is no critical limit to the molecular weight of the modifying compound other than one of practicality in handling. It is generally somewhat preferred, from a practical standpoint, to use the compounds which are normally liquid with those that are normally gaseous being more preferred. In the practice of the present process, the preferred compounds are the mono- and di-halogen substituted hydrocarbons of no more than six carbon atoms and, as indicated above, the hydrogen halides. Though all of the halogens from the group consisting of bromine, chlorine and iodine are operable in the present invention, it is generally preferred to use those compounds containing chlorine and bromine with bromine being preferred over chlorine.

Among the sulfur-bearing compounds useful in the present invention are the following non-limiting examples:

allyl sulfide
benzyl disulfide
2-methyl-1-butanethiol
2-methyl-2-butanethiol
butyl disulfide
1,2-ethanedithiol
ethylene sulfide
ethyl sulfide
1-heptanethiol
isoamyl disulfide
isobutyl sulfide
methyl sulfide
1-naphthalenethiol
phenyl disulfide
2-methyl-1-propanethiol
2,2'-thiodiethanol
acetyl disulfide
o-bromo-benzene-sulfonic acid
p-chloro-benzene-sulfonic acid
methyl-benzenesulfonic acid
2-2'-bithiophene
benzoyl disulfide
benzyl sulfide
3-methyl-1-butanethiol
tert-octanethiol
butylsulfide
ethanethiol
ethyl disulfide
furfuryl mercaptan
1-hexanethiol
isoamyl sulfide
methyl disulfide
2-naphthalenethiol
1-pentanethiol
1-propanethiol
2-propanethiol
thiophene
o-formyl-benzene-sulfonic acid
benzyl sulfoxide
butyl sulfate
butyl sulfone
dithio-carbamic acid
thiono-carbamic acid
dithiol-carbonic acid
dodecyl sulfate
ethionic anhydride
ethyl sulfone
ethyl sulfuric acid
methyl sulfoxide
2-bromothiophene
2,5-dimethylthiophene
2,3-dimethylthiophene
1-decanol sulfate
methyl sulfite
bis-(β-dichloroethyl) sulfide
tetradecyl sulfate
thionaphthenequinone
3-methylthiophene
butyl sulfoxide
thiol-carbamic acid
trithio-carbonic acid
benzenethiol
1,2-ethanedisulfonic acid
ethyl sulfite
ethyl sulfoxide
methanethiol
β,β'-dichloroethyl sulfide
2-chlorothiophene
2,5-diiodothiophene
vinyl sulfide
methyl sulfate
dichlorophenylphosphine sulfide
ethyl methyl sulfide
benzenesulfonic acid
p-bromo-benzene-sulfonic acid
thionaphthene
2-methylthiophene
α-toluenethiol As noted from the above list of compounds, the sulfur-bearing modifying agents may contain such elements other than sulfur as carbon, hydrogen, oxygen, nitrogen, chlorine, bromine, iodine, and the like. Among the preferred compounds which form $H_2S$ in the reaction zone are such sulfur-bearing compounds as mercaptans or thiols, both aliphatic and aromatic, thioethers and thiourea. The preferred sulfur-bearing compounds are those containing only the additional elements of carbon and/or hydrogen. When using these preferred sulfur-bearing compounds containing carbon and hydrogen, it is generally preferred that they contain no greater than 20 carbon atoms, with those containing less than 10 carbon atoms being preferred.

It is, of course, not necessary that the modifying agent be limited to a compound which will form only one of the above-mentioned hydrogen halides or hydrogen sulfide. It is within the scope of the present invention that a combination of the two types of compounds may be used. For example, the present invention contemplates the use in combination as a modifying agent such compounds as bromopropane and benzyl mercaptan. Also, one compound may contain both a halogen atom and a sulfur atom and may suffice as a combination modifying agent. Such a compound is 2-bromothiophene.

The amount of modifying agent necessary in carrying out the process of the present invention is such as to cause a molar concentration in the reaction mixture of no less than 0.01 mole percent of $H_2S$, HBr, HCl, HI, or combinations thereof. Seldom will the amount of the modifying agent in the reaction mixture exceed 25 mole percent. A preferred amount of modifying agent is that amount which will produce a concentration of $H_2S$, HBr, HCl, HI, or combinations thereof in admixture with the mono-alkyl aromatic hydrocarbon within the range of 0.5 to 5.0 mole percent.

The mono-alkyl benzene feeds useful in carrying out the process of the present invention have the formula

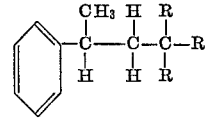

wherein R is either hydrogen or hydrocarbonyl radical. The hydrocarbonyl radical may be either alkyl or aryl. Such hydrocarbons include sec-butyl benzene, α-methyl butyl benzene, α-methyl pentyl benzene, α-methyl hexyl benzene, α-methyl heptyl benzene, 2-methyl-4-phenylpentane, 2,2-dimethyl-4-phenylpentane, 2,2-dimethyl-5-phenylhexane, -methyl-5-phenylhexane, and the like. Preferred mono-alkyl benzene feeds to the process of the present invention are those described above wherein all three of the R's are hydrogen or wherein at least one of the R's is hydrogen and at least one of the remaining R's is an alkyl radical of 1 to 6 carbon atoms, the other R being either hydrogen or an alkyl or aryl radical of 1 to 6 carbon atoms.

Temperatures at which the present invention is most often operated are within the range of 500 to 800° C. A preferred range of temperature for operating the process of the present invention is 550 to 650° C. Generally, the pressures of the process of the present invention are within the range of 0 to 1,000 p.s.i.a., preferably within the range of from about 0.75 to about 125 p.s.i.a. As a practical matter, the process of the present invention is usually operated at or near atmospheric pressure.

The residence time of the mono-alkyl benzene within the reaction zone will usually be not less than 0.05 second or more than 10 minutes. A preferred residence time, however, is usually within the range of 1 to 25 seconds.

The method whereby the modifying agent and the mono-alkyl benzene are brought into contact with one another is critical only to the extent that there should be a thorough, intimate contact between these components. Mono-alkyl benzene and modifying agent may be concurrently introduced into a reaction zone which may be a batch container or a reaction chamber designed for continuous flow. If the process of the present invention is carried out as a continuous process, the mono-alkyl benzene and modifying agent may be introduced into contact with one another by concurrent, crosscurrent or countercurrent flow.

What is claimed is:

1. A thermal non-catalytic process for producing α-methylstyrene which comprises subjecting mono-alkyl benzenes having the general formula

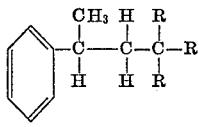

wherein R is selected from the group consisting of hydrogen and hydrocarbonyl radicals, in a reaction zone to a temperature of from about 500 to 800° C. in the presence of a modifying agent selected from the group consisting of (1) $H_2S$, HBr, HCl, HI, and combination thereof, and (2) compounds and elements which under the conditions of the reaction zone will form $H_2S$, HBr, HCl, HI, or combinations thereof.

2. The process of claim 1 wherein the modifying agent is a halogen-substituted hydrocarbon of no greater than six carbon atoms.

3. The process of claim 1 wherein the modifying agent is selected from the group consisting of $H_2S$, HCl, HBr, HI, and combinations thereof.

4. The process of claim 1 wherein the modifying agent is selected from the group consisting of iodine, bromine, chlorine and combinations thereof.

5. The process of claim 1 wherein the modifying agent is elemental sulfur.

6. The process of claim 1 wherein the modifying agent is a sulfur-bearing compound selected from the group consisting of mercaptans, thioethers and thioureas.

7. The process of claim 1 wherein the amount of modifying agent is such as to cause a molar concentration of a compound selected from the group consisting of $H_2S$, HBr, HCl, HI, and combinations thereof, in the reaction zone with the range of 0.01 to 25 mole percent.

8. The process of claim 1 wherein the temperature in the reaction zone is within the range of 550 to 650° C.

9. The process of claim 1 wherein the pressure in the reaction zone is within the range of 0 to 1,000 p.s.i.a.

10. The process of claim 1 wherein one of the R's is hydrogen, another of the R's is an alkyl radical of 1 to 6 carbon atoms, and the third R is hydrogen or a radical selected from the group consisting of alkyl and aryl radicals of 1 to 6 carbon atoms.

References Cited

UNITED STATES PATENTS

| 1,552,874 | 9/1925 | Ostromislensky et al. | 260—669 |
| 1,552,875 | 9/1925 | Ostromislensky et al. | 260—669 |
| 1,938,827 | 12/1933 | Gibbons et al. | 260—669 |
| 1,997,967 | 4/1935 | Gibbons et al. | 260—669 |

OTHER REFERENCES

Dobryanskii et al., "Materials on the Mechanism of Vapor Phase Cracking," from Transactions of the Research Plant "Khimgaz." Materials on Cracking and Chemical Treatment of Cracked Products, vol. 2, O.N.T.I., Leningrad, 1935, pp. 60–97. (English translation in 260–680.) Pp. 1, 6 and 7 are pertinent.

DELBERT E. GANTZ, *Primary Examiner.*

CURTIS R. DAVIS, *Assistant Examiner.*

U.S. Cl. X.R.

260—672